United States Patent [19]

Swift

[11] Patent Number: 5,636,013
[45] Date of Patent: Jun. 3, 1997

[54] SUSPENSION ASSEMBLY STATIC ATTITUDE AND DISTANCE MEASURING INSTRUMENT

[75] Inventor: David R. Swift, Glencoe, Minn.

[73] Assignee: Hutchinson Technology Incorporated, Hutchinson, Minn.

[21] Appl. No.: 368,547

[22] Filed: Jan. 4, 1995

[51] Int. Cl.[6] .................. G01C 3/00; G01B 11/26; G01B 11/14
[52] U.S. Cl. .................. 356/3.03; 356/152.2; 356/375
[58] Field of Search .................. 356/139.03, 152.2, 356/3.03–3.08, 375

[56] References Cited

U.S. PATENT DOCUMENTS

| 4,373,805 | 2/1983 | Mallinson . | |
| 4,477,185 | 10/1984 | Berger et al. | 356/400 |
| 4,704,020 | 11/1987 | Murakami et al. . | |
| 5,164,579 | 11/1992 | Pryor et al. | 250/206.1 |

OTHER PUBLICATIONS

CyberOptics Corporation, Point Range Sensor bulletin, 1 page, Jul. 1973.
Advance Imaging Inc., S–SPR1 Suspension Static Pitch & Roll Measurement System brochure, 2 pages, Apr. 1994.
Kaplan, Herbert, *Photonics at Work, A New Generation of Detectors*, pp. 54 and 56, Oct. 1991.

*Primary Examiner*—Stephen C. Buczinski
*Attorney, Agent, or Firm*—Faegre & Benson

[57] ABSTRACT

An instrument for measuring both the static attitude and Z-height of a suspension assembly flexure. The instrument includes an autocollimation system for measuring static attitude angles. The autocollimation system is fixedly mounted to a laser point range sensor for measuring Z-height distances. Optics coincidentally direct the beams of light from the collimation system and from the point range sensor system to a measurement point. The optics include at least one reflector or other optical device. The instrument offers accurate distance and angle readings in a shore amount of time with no repositioning of the instrument, the base, or the part to be measured.

12 Claims, 4 Drawing Sheets

SUSPENSION ASSEMBLY STATIC ATTITUDE AND DISTANCE MEASURING INSTRUMENT

BACKGROUND OF THE INVENTION

The present invention relates to an instrument for making static attitude (angular orientation) and vertical offset distance measurements (Z-height) of elements of a head suspension assembly (HSA). In particular, the present invention is an instrument that includes an autocollimation system and a point range sensor.

HSAs position a read/write head over the spinning surface of a data storage device (e.g. a magnetic hard disk). HSAs are some of the smallest and most delicate components of a rigid disk drive. An HSA includes a suspension assembly, an elongated spring structure, with a head assembly positioned at a distal end. Suspension assemblies act in a similar fashion to the needle arm in a record player, positioning the head assembly nanometers from the surface of a spinning disk in the disk drive. Typical suspension assemblies measure less than 20 mm long and are 0.03 to 0.1 mm thick. Suspension assemblies generally include an elongated load beam with a gimbal flexure located at a distal end and a base plate or other mounting means located at a proximal end.

The gimbal flexure comprises a head bonding platform suspended by spring arms. The head assembly is mounted to this head bonding platform. The head assembly includes an air bearing slider and a read/write magnetic transducer formed on the slider. The slider is aerodynamically shaped to use the air stream generated by the spinning disk to produce a lift force. During operation of the disk drive, the spring arms provide gimballing motion to maintain the head assembly at a desired orientation with respect to the surface of the disk. The suspension assembly must balance the different lift forces on the outside and the inside air-bearing surfaces of the slider (the outside circumference of a round disk has a faster linear velocity than the inside, and therefore produces more lift), static forces (e.g. weight and pressure applied on the slider by the suspension assembly), and dynamic forces (e.g. momentum). The gimbal flexure and the whole HSA are manufactured within precise tolerances.

In a magnetic disk drive, the density and accuracy of the data stored on the disk depend on the distance and attitude of the head assembly with respect to the surface of the disk. The size of the magnetic field "spot" written and read by the transducer is directly proportional to the square power of the distance between the transducer and the disk. Small changes in distance and/or attitude can cause the head assembly to "crash", that is, to hit the surface of the spinning disk. A crash can destroy both the transducer and the data on the surface of the disk. Tight manufacture tolerances are a factor in determining disk drive reliability.

HSA manufacturers must repeatedly measure and control the Z-height and static attitude of different elements of the HSA at various points during the manufacturing process. The reference point for both the Z-height and the static attitude measurements is a manufacturing datum plane. The manufacturing datum plane is a horizontal plane representing a suspension mounting surface of an actuator. During manufacturing, the manufacturing datum plane is placed generally parallel to and below the suspension assembly.

A static attitude measurement includes a pitch axis angle measurement and a roll axis angle measurement measured in relation to the datum plane. The pitch and the roll axes are parallel to the horizontal plane and are mutually perpendicular, intersecting at a point on the head bonding platform. The roll axis is usually aligned with the longitudinal axis of the suspension assembly.

Z-height is often measured using a laser triangulation probe, also known as a point range sensor. The point range sensor produces a thin beam of light which is directed at a known angle to a point to be measured on the surface of the HSA. The beam of light is reflected by the surface of the HSA and strikes a light sensor array. The position of the reflected beam on the sensor array can be correlated by triangulation to a Z-height measurement. Laser triangulation offers fast point readings (measurements in less than 500 milliseconds) and can offer very good distance accuracy.

Static attitude can be measured using autocollimation systems. Autocollimation systems are measuring instruments that generate a collimated light beam (a light beam having parallel rays of light) having a diameter several (i.e., thirty to three hundred) times larger than the diameter of the light beam generated by the point range sensor system. The collimated light beam is directed to and reflected off the surface of the part being measured. The reflected light beam strikes a linear array of light sensors. The sensors collect data on the reflected light beam which is fed into a computer to calculate the pitch and roll angles of the part. Autocollimation systems offer accurate and fast angle measurements.

Manufacturing tolerances of HSA elements are commonly measured using one of two methods. The first method comprises placing the part to be measured on a measurement fixture and assuming that the Z-height value is close to correct based on how the part is fixtured. Of course, this means that the exact value of the Z-height measurement is unknown. The static attitude is then measured using an autocollimation system.

The second method again has the part placed in a measurement fixture. A moving point range sensor is used to scan across the surface of the part in both the x and the y directions, making Z-height measurements at interval points. An alternative to moving the sensor is to move the part while the sensor remains in a fixed position. A computer is used both to calculate the Z-height measurements and to compute a theoretical plane based on the scanned points. The theoretical plane is used for yielding the static attitude measurements. The repeated movement and positioning of the point range sensor and/or the part causes measurement errors along all three axis. The accuracy of the static attitude measurements depends on the number of scanned points. This method is time-intensive, due to the number of readings and movements required.

In theory, a third method of measurement is possible. The method would involve first using an autocollimation system to measure static attitude and then to either move the part and/or the probes to measure Z-height separately using a point range sensor. However, this two-station method would be time-consuming, require repeated movement of the part or the systems, and introduce severe positional errors. Repeated movement could cause damage to the HSA or the instruments.

The current measurement methods and instruments introduce significant measurement error sources and are time and manipulation intensive. There is a need for an alternative system for measuring the static attitude and Z-height of the parts of a HSA.

SUMMARY OF THE INVENTION

The present invention is an instrument that measures both Z-height and static attitude of an HSA part without having to reposition either the part or the instrument. The instrument offers the distance measurement accuracy of the point range sensor system and the static attitude measurement capabilities of the autocollimation system. The instrument can yield both measurements in less than 500 milliseconds.

The instrument comprises a generally planar base for receiving the part to be measured, an autocollimation system which generates a collimated light beam, a point range sensor system which generates a triangulation light beam, and optics that direct the light beams to make both beams coincident on the measurement point of the part to be measured. After the light beams are reflected off the measurement point, the optics also direct the reflected light beams to sensors in their respective systems. The position of the reflection of each beam is measured by the sensors and used to calculate the static attitude and Z-height of the part.

In one embodiment, the autocollimation system and the point range sensor system are fixedly mounted together at a predetermined distance and orientation with respect to the base. In a preferred embodiment the autocollimation system is mounted on a lateral surface of the point range sensor system and the optics include two optical reflectors arranged to direct the collimated light beam to be coincident with the triangulation light beam on the measurement point.

DETAILED DESCRIPTION OF THE PREFERRED EMBODIMENTS

Figure 1:
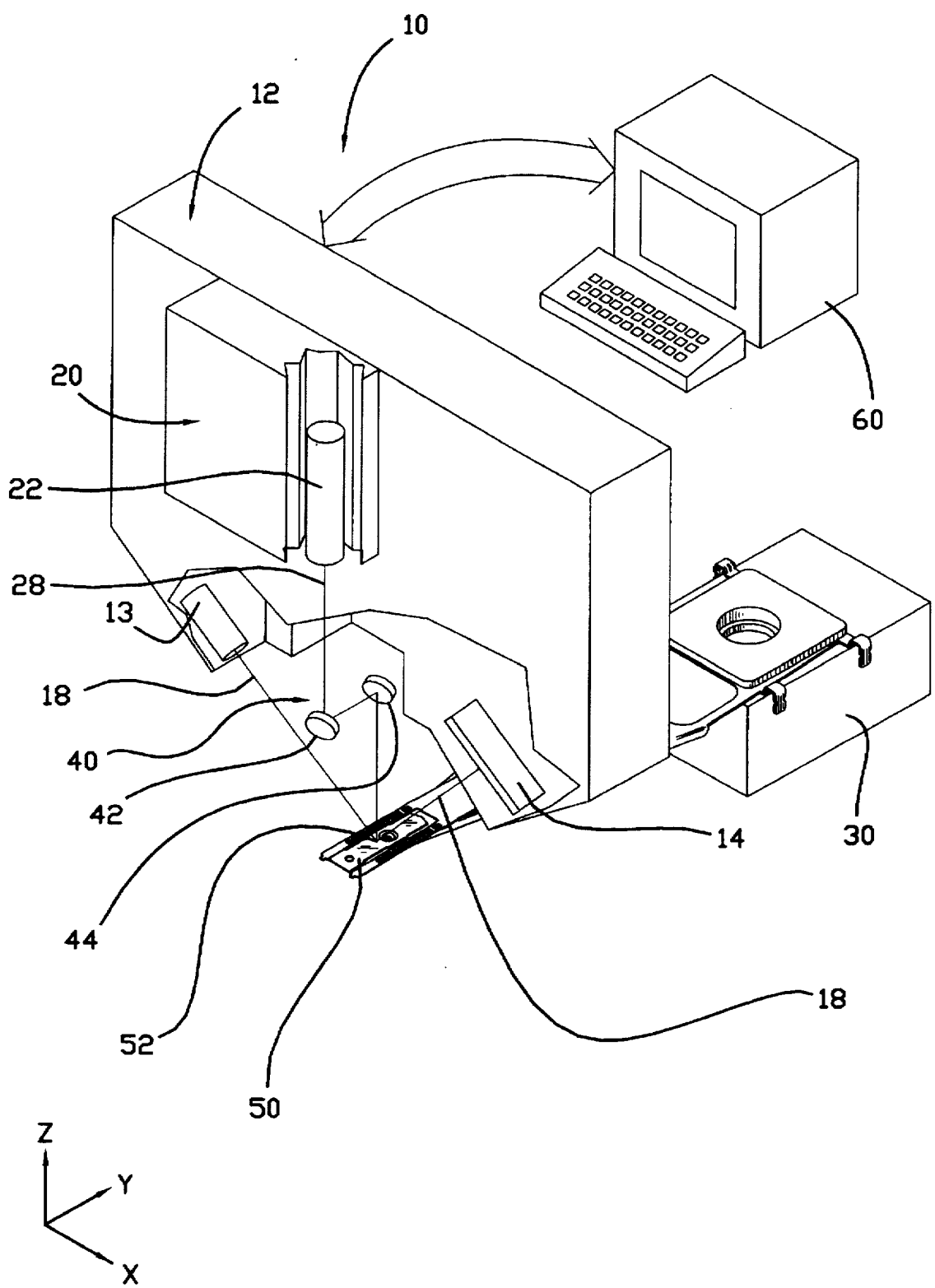
FIG. 1 is an isometric view of a static attitude and Z-height measuring instrument in accordance with the present invention, with portions thereof broken away.
Figure 2:
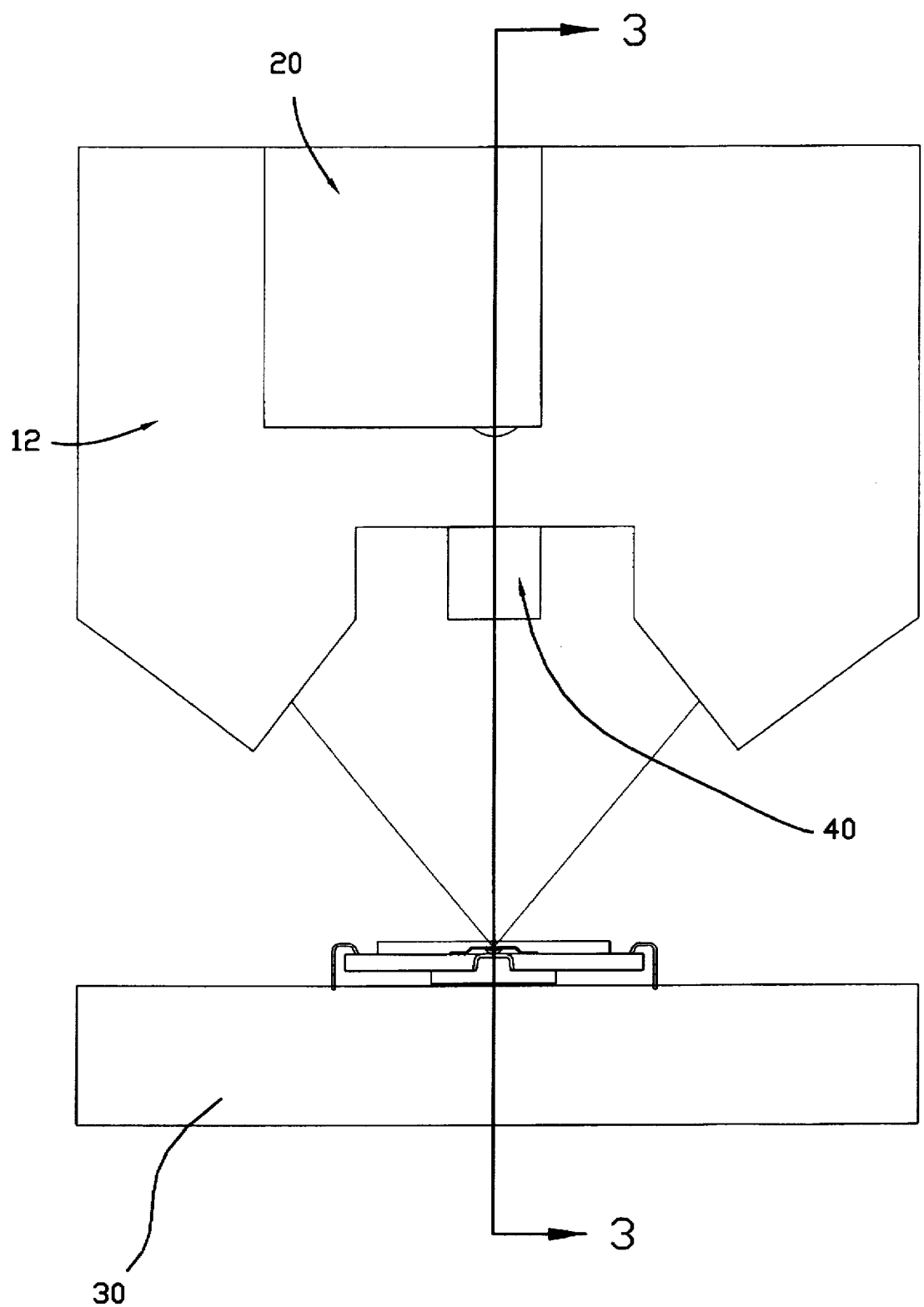
FIG. 2 is a plan view of the instrument shown in FIG. 1.
Figure 3:
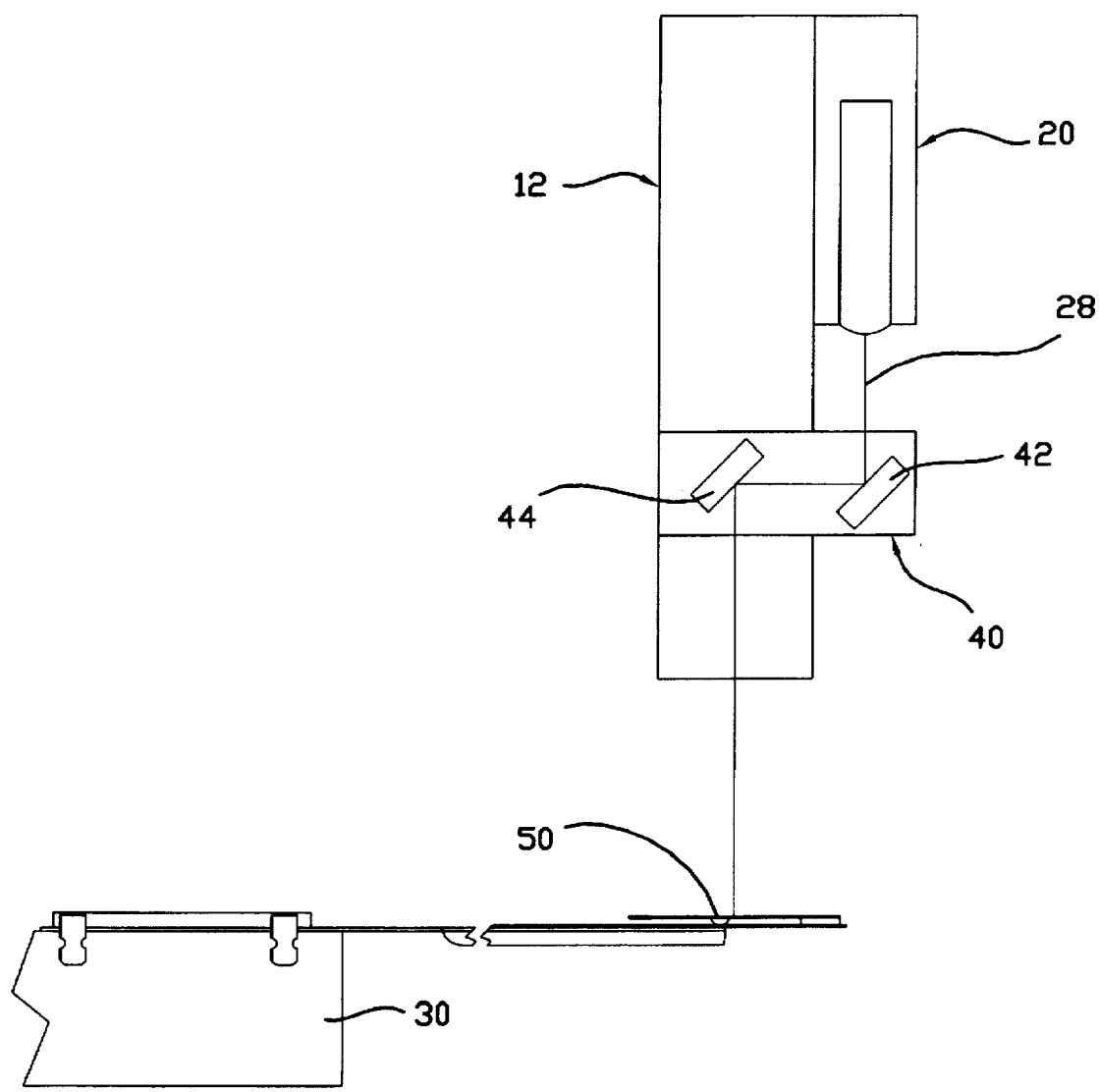
FIG. 3 is a cross-sectional view of the instrument shown in FIGS. 1 and 2 taken along line 3—3.

A static attitude and Z-height measuring instrument 10 in accordance with the present invention is illustrated in FIGS. 1–3. For reference purposes, FIG. 1 defines x, y, and z axes.

Instrument 10 includes a point range sensor system 12, an autocollimation system 20, a base 30, and optics 40 (better seen in FIG. 3). A preferred point range sensor system 12 is the Cyber PRS-30, available from CyberOptics Corporation in Minneapolis, Minn. A preferred autocollimation system 20 is the "Mini S.A.M.S.", available from Optical Systems Corporation at Valencia, Calif.

In the embodiment shown in FIGS. 1 and 2, the point range sensor system 12 and the autocollimation system 20 are both aligned generally along the z-axis and mounted side-by-side with respect to each other. The base 30 is a generally flat surface fixedly mounted perpendicular to the z-axis at a fixed distance from the point range sensor 12 and the autocollimation system 20. The part to be measured, in this case a suspension assembly 50, is secured to base 30 by clamps or by other methods known in the art (not shown).

The point range sensor system 12 includes a light source 13 (e.g., a laser) and a light sensitive sensor array 14, both mounted inside of a housing and generally facing a front end. The housing is oriented so that during operation the light source 13 produces a thin beam of light 18 (preferably a beam of laser light) aimed at a measurement point 52 on the surface of the suspension assembly 50. Optics (not shown) focus the beam of light 18. The thin light beam 18 reflects off the measurement point 52 and strikes the light sensitive sensor array 14. Since the angle of incidence and the angle of reflection of the beam are constant, the point at which the reflected light beam strikes the sensor array 14 depends on the distance between the measurement point 52 and the point range sensor system 12. Using the sensor array 14 point of reflection measurement, the Z-height distance of the measurement point 52 can be calculated by triangulation. By subtracting the obtained Z-height value from other known reference values (e.g., the z-axis distance to the base 30), thicknesses of the part or other differential Z-height measurements can be obtained. A computer 60 electrically coupled to the autocollimation system and point range sensor system can be used to perform the calculations in a known manner.

The autocollimation system 20 includes a collimated light source 22 and a light sensitive sensor (not shown). The collimated light source 22 produces a collimated light beam 28. In the depicted embodiment, the collimated light source 22 and the light sensitive sensor are mounted both inside of a housing, facing a front end. The housing for the autocollimation system is mounted to a side surface of the housing of the point range sensor system 12. The collimated light source 22 is mounted so that the collimated light beam 28 originally travels in the negative direction of the z-axis. In other embodiments (not shown), the collimated light source 22 can be placed outside of the housing and/or in a different orientation, and the collimated light beam 28 be directed by additional optics to the measurement point.

In the embodiment shown, the collimated light beam 28 is coupled to the measurement point 52 by optics 40, shown in FIGS. 1–3. Optics 40 of FIG. 3, align the collimated light beam 28 with the measurement point 52 and make the collimated light beam 28 coincident with the light beam 18 from the point range sensor 12. The collimated light beam 28 is reflected off the measurement point 52 on the surface of the suspension assembly 50. The reflected light beam is directed by the optics 40 back to the light sensitive sensor. The light sensitive sensor is placed in the path of the reflection of the collimated light beam 28.

Optics 40 comprise a first reflector 42, placed at a forty-five degree angle with respect to the y-axis, and a second reflector 44, placed at a 225 degree angle with respect to the y-axis. In other words, the reflectors 42 and 44 are parallel and opposite each other and are mounted on the y-axis at a forty-five degree angle with respect to the incoming beam 28. The reflectors 42 and 44 are mounted inside of a hollow rectangular casing, with openings for the optical path, mounted on the point range sensor system 12. In the embodiment shown, the reflectors 42 and 44 are flat mirrors. In alternative embodiments (not shown), the optics can include mirrors, optical tiles, prisms, lenses, optic fibers, or other optical devices known in the art, arranged in a variety of configurations. The first reflector 42 redirects the collimated light beam 28 ninety degrees, reflecting the beam towards the second reflector 44, in the positive direction of the y-axis. The second reflector 44 is aligned opposite the measurement point 52 along the z-axis and redirects the light beam 28 back another ninety degrees towards the measurement point 52, in the negative direction of the z-axis. The collimated light beam 28 is thus aligned with the measurement point 52 and is coincident with light beam 18.

In the arrangement of instrument 10, the triangulation light beam 18 travels a triangular path between the point light source 13, the suspension assembly 50, and the light sensor 14, defining a first plane along the z-axis and x-axis. The collimated light beam 28 travels a step-shaped path between the autocollimation system 20, through the light beam redirecting means 40, to the measurement point 52, and back. The path of the collimated light beam 28 defines a second plane along the y-axis and the z-axis. The first plane perpendicularly intersects the second plane along the z-axis.

In other embodiments not shown, the autocollimation system 20 and the point range sensor system 12 can be arranged in a variety of different positions. The first plane and the second plane defined by the paths of the light beams can intersect at a variety of angles. In another embodiment, optics 40 can change the path of the triangulation light beam 18 as well as, or instead of, the path of the collimated light beam 28.

Figure 4:
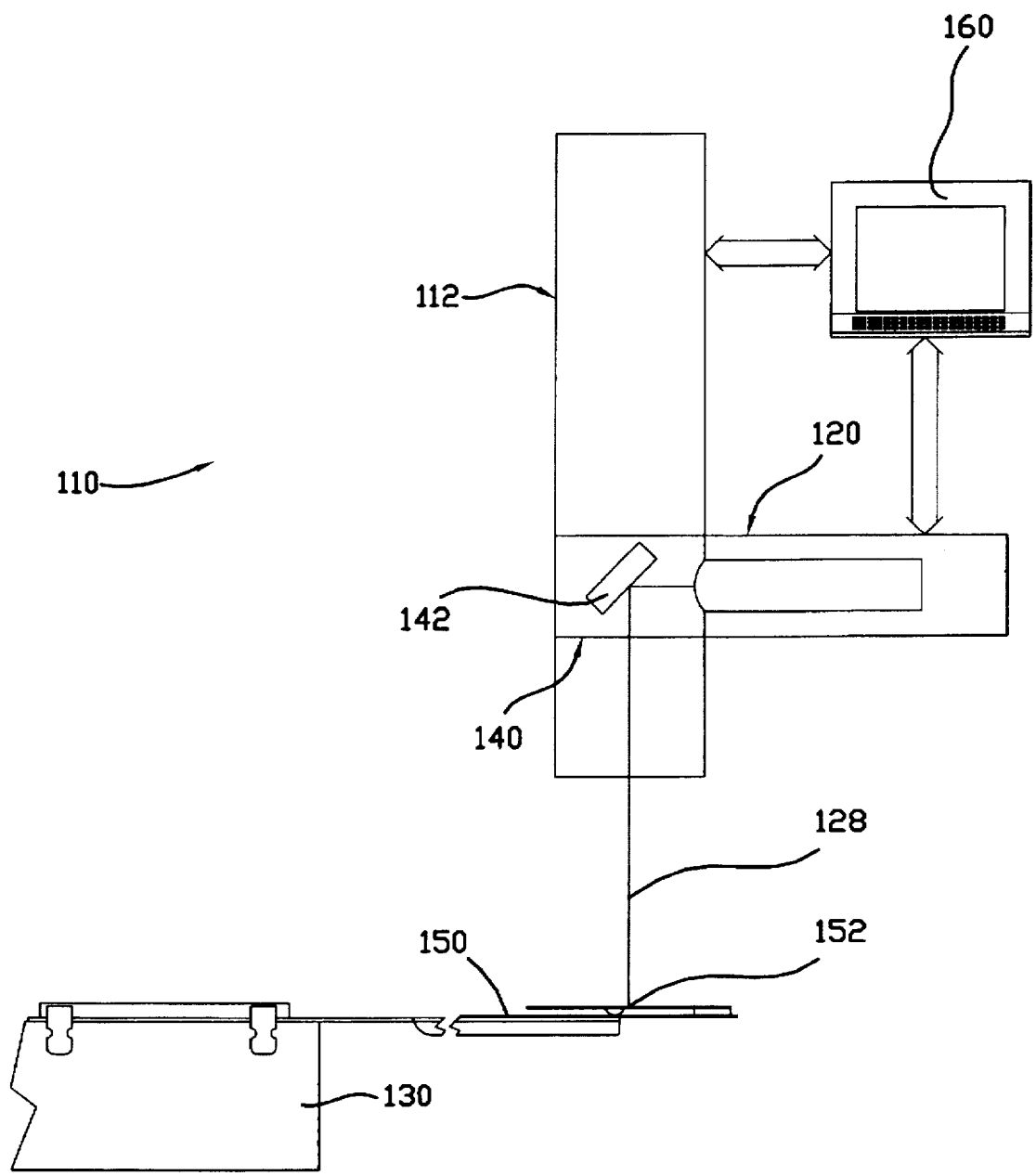
FIG. 4 is a cross-sectional view of an alternative embodiment of the present invention.

An alternative embodiment of the present invention, static attitude and Z-height measurement instrument 110, is shown in FIG. 4. Similar elements of instrument 110 and of the instrument 10 shown in FIGS. 1–3 are numbered with the same last two nomenclature digits.

In instrument 110, autocollimation system 120 is oriented so that collimated beam 128 originally travels in the negative direction of a y-axis. The autocollimation system 120 is mounted to point range sensor system 112, which is placed longitudinally along a z-axis. Optics 140 couple both systems and include one reflector 142 aligned along the intersection of the z-axis and the y-axis and positioned at a 135 degree angle with respect to the y-axis. Suspension assembly 150 is placed on base 130. Measurement point 152 on the surface of suspension assembly 150 is aligned along the z-axis. Reflector 142 directs the collimated light beam 128 ninety degrees, to make the collimated light beam 128 coincident with the triangulation light beam 118 (not shown).

The present invention offers significant advantages over the prior art. The instrument allows accurate distance and angle measurements simultaneously or in quick succession, without moving the part or the instrument. Point readings are done in approximately less than 100 milliseconds and angle readings can be done in less than 400 ms. The instrument increases the measurement throughput and thus increases production capacity and reduces costs.

The invention is not to be taken as limited to all of the details described herein as modifications and variations thereof may be made without departing from the spirit or scope of the invention.

What is claimed is:

1. An instrument for measuring static attitudes and offset distances at measurement points on head suspension assembly parts, comprising:
    a base for receiving a part to be measured and for positioning a measurement point of the part at a predetermined location;
    a point range sensor system mounted at a fixed position with respect to the base for generating and detecting a distance measuring triangulation light beam;
    an autocollimation system mounted at a fixed position with respect to the base, the autocollimation system for generating and detecting a static attitude measuring collimated light beam; and
    coincidence means for causing the triangulation light beam and the collimated light beam to be coincident on the measurement point;
    wherein the base is fixedly mounted with respect to the autocollimation system and the point range sensor system.

2. The instrument of claim 1 wherein the autocollimation system is mounted side-by-side to the point range sensor system, and wherein the coincidence means includes optics for directing the static attitude measuring collimated light beam to the measurement point.

3. The instrument of claim 2 wherein the optics include a first reflector and a second reflector, wherein the first reflector directs the static attitude measuring collimated light beam to the second reflector, and wherein the second reflector directs the static attitude measuring collimated light beam to the measurement point on the part.

4. The instrument of claim 2 wherein the optics include a single reflector which redirects the static attitude measuring collimated light beam to the measurement point.

5. An instrument for measuring static attitudes and offset distances at measurement points on head suspension assembly parts, comprising:
    a base for receiving a part to be measured and for positioning a measurement point of the part at a predetermined location;
    a point range sensor system mounted at a fixed position with respect to the base for generating and detecting a distance measuring triangulation light beam for measuring the Z-height of a part mounted on the base;
    an autocollimation system mounted at a fixed position with respect to the base, the autocollimation system for generating and detecting a static attitude measuring collimated light beam; and
    coincidence means for causing the triangulation light beam and the collimated light beam to be coincident on the measurement point.

6. The instrument of claim 5 wherein the autocollimation system is mounted side-by-side to the point range sensor system, and wherein the coincidence means includes optics for directing the static attitude measuring collimated light beam to the measurement point.

7. The instrument of claim 6 wherein the optics include a first reflector and a second reflector wherein the first reflector directs the static attitude measuring collimated light beam to the second reflector, and wherein the second reflector directs the static attitude measuring collimated light beam to the measurement point on the part.

8. The instrument of claim 6 wherein the optics include a single reflector which redirects the static attitude measuring collimated light beam to the measurement point.

9. An instrument for measuring static attitudes and offset distances at measurement points on head suspension assembly parts, comprising:
    a base for receiving a part to be measured and for positioning a measurement point of the part at a predetermined location;
    a point range sensor system mounted at a fixed position with respect to the base for generating and detecting a distance measuring triangulation light beam;
    an autocollimation system mounted at a fixed position with respect to the base, the autocollimation system for generating and detecting a static attitude measuring collimated light beam;
    coincidence means for causing the triangulation light beam and the collimated light beam to be coincident on the measurement point; and
    a computer electrically coupled to the autocollimation system and point range sensor system for calculating static attitude and distance measurements of the part.

10. The instrument of claim 9 wherein the autocollimation system is mounted side-by-side to the point range sensor system, and wherein the coincidence means includes optics for directing the static attitude measuring collimated light beam to the measurement point.

11. The instrument of claim 10 wherein the optics include a first reflector and a second reflector, wherein the first reflector directs the static attitude measuring collimated light beam to the second reflector, and wherein the second reflector directs the static attitude measuring collimated light beam to the measurement point on the part.

12. The instrument of claim 10 wherein the optics include a single reflector which redirects the static attitude measuring collimated light beam to the measurement point.

* * * * *

UNITED STATES PATENT AND TRADEMARK OFFICE
CERTIFICATE OF CORRECTION

PATENT NO. : 5,636,013
DATED      : June 3, 1997
INVENTOR(S) : David R. Swift et al.

It is certified that error appears in the above-indentified patent and that said Letters Patent is hereby corrected as shown below:

On the title page, item [75] Inverntors, insert the following inventor:  --John B. Hayes, Tucson, Arizona--

Signed and Sealed this

Ninth Day of September, 1997

Attest:

BRUCE LEHMAN

Attesting Officer

Commissioner of Patents and Trademarks